(12) United States Patent
Park et al.

(10) Patent No.: US 10,585,220 B2
(45) Date of Patent: Mar. 10, 2020

(54) OPTICAL FILTER AND METHOD OF MANUFACTURING SAME

(71) Applicant: UTI, Inc., Chungcheongnam-do (KR)

(72) Inventors: Deok Young Park, Gyeonggi-do (KR); Jae Young Hwang, Gyeonggi-do (KR); Hak Chul Kim, Chungcheongnam-do (KR); Hyunho Kim, Seoul (KR); Tea Joo Ha, Chungcheongnam-do (KR); JongHwa Lee, Gyeonggi-do (KR)

(73) Assignee: UTI, Inc. (KR)

( * ) Notice: Subject to any disclaimer, the term of this patent is extended or adjusted under 35 U.S.C. 154(b) by 0 days.

(21) Appl. No.: 16/128,190

(22) Filed: Sep. 11, 2018

(65) Prior Publication Data
US 2019/0094429 A1    Mar. 28, 2019

(30) Foreign Application Priority Data
Sep. 28, 2017  (KR) .......................... 10-2017-0125910

(51) Int. Cl.
| | | |
|---|---|---|
| *G02B 5/20* | (2006.01) | |
| *C03C 17/34* | (2006.01) | |
| *C03C 21/00* | (2006.01) | |
| *C03C 17/42* | (2006.01) | |
| *C03B 33/02* | (2006.01) | |

(52) U.S. Cl.
CPC .............. *G02B 5/208* (2013.01); *C03C 17/34* (2013.01); *C03C 17/42* (2013.01); *C03C 21/002* (2013.01); *C03B 33/0222* (2013.01)

(58) Field of Classification Search
CPC ......... G02B 5/208; C03C 17/34; C03C 17/42; C03C 21/002; C03B 33/022

USPC ......................................................... 359/350
See application file for complete search history.

(56) References Cited

U.S. PATENT DOCUMENTS

| | | | | |
|---|---|---|---|---|
| 6,104,530 A | * | 8/2000 | Okamura ............... | B32B 27/06 359/359 |
| 2006/0105175 A1 | * | 5/2006 | Otani ...................... | H01J 11/10 428/411.1 |
| 2009/0218950 A1 | * | 9/2009 | Hong ...................... | H01J 11/10 315/85 |
| 2011/0212336 A1 | * | 9/2011 | Kawamoto .......... | H05K 9/0096 428/469 |
| 2016/0318796 A1 | * | 11/2016 | Masuda .................. | C03C 17/32 |

(Continued)

FOREIGN PATENT DOCUMENTS

| | | |
|---|---|---|
| KR | 1020150067154 A | 6/2015 |
| KR | 101570658 B1 | 11/2015 |
| KR | 1020160088147 A | 7/2016 |

*Primary Examiner* — William R Alexander
(74) *Attorney, Agent, or Firm* — Mendelsohn Dunleavy, P.C.

(57) ABSTRACT

Disclosed is an optical filter and a method of manufacturing the same, the optical filter including a tempered glass substrate and an optical filter formed on upper and lower surfaces of the tempered glass substrate and the method including: forming a sheet-cutting portion on a base glass substrate on a per-cell basis; tempering the base glass substrate such that upper and lower surfaces of the base glass substrate are tempered and a side portion thereof is tempered through the sheet-cutting portion as well; forming an optical filter layer on each of upper and lower surfaces of the base glass substrate; and dividing the base glass substrate into cells where each cell serves as a cell-based optical filter.

20 Claims, 3 Drawing Sheets

(56) References Cited

U.S. PATENT DOCUMENTS

2016/0347655 A1* 12/2016 Meinhardt .............. C03C 3/093
2017/0192257 A1* 7/2017 Branda ...................... B60J 3/04
2017/0276846 A1* 9/2017 Ishido ...................... G02B 1/14

* cited by examiner

OPTICAL FILTER AND METHOD OF MANUFACTURING SAME

CROSS REFERENCE TO RELATED APPLICATION

The present application claims priority to Korean Patent Application No. 10-2017-0125910, filed on Sep. 28, 2017, the entire contents of which is incorporated herein for all purposes by this reference.

BACKGROUND OF THE INVENTION

Field of the Invention

The present invention relates to an optical filter and a method of manufacturing the same. More particularly, the present invention relates to an optical filter and a method of manufacturing the same in which an optical filter is provided by using a tempered glass substrate such that the optical filter is strengthened.

Description of the Related Art

An optical filter is a device that selectively transmits light in a particular range of wavelengths and implemented as multilayer configured on a substrate according to optical design.

The optical filter is applied to various fields, and particularly, widely used to control wavelengths of light received by an imaging lens of a camera.

In general, a solid-state imaging device such as CCD and CMOS which convert light into electric signals is used in video cameras, digital cameras, and cameras of smart phones. The solid-state imaging device is used not only in the visible spectrum (from 400 nm to 700 nm) but also in the near-infrared spectrum (up to 1200 nm) whereby there is a difference in color between an image that people actually recognize and a represented image.

To correct the difference, an optical filter such as a near-infrared cutoff filter (NIR cutoff filter) for attenuating light in the wavelength of the near-infrared spectrum is used.

The NIR cutoff filter is provided between the imaging lens and the solid-state imaging device, which constitute an imaging device, and attenuates the light of the near-infrared spectrum incident from the imaging lens and provides the passing light to a light-receiving unit of the solid-state imaging device.

Conventionally, a reflective NIR cutoff filter has been used, which is configured with a near-infrared reflection film on an upper or lower portion of a transparent glass substrate. However, as a high-resolution model of the filter has been developed in recent years, a hybrid filter which is a combination of an absorption type and a reflection type is widely used.

For example, there is a technique of forming a near-infrared reflective film configured as an oxide multilayer film on a blue glass substrate that absorbs near infrared rays.

However, there is a problem that the glass substrate is easily broken by external impact or stress. In addition, in the case of a commercially available NIR cutoff filter, the entire thickness thereof is increased due to the thick glass substrate, and even when the thickness of the glass substrate is thin, it is difficult to handle and machine the filter.

In recent years, a technique of forming a near-infrared reflective film has been used, the near-infrared reflective film including a resin substrate containing a dye absorbing near-infrared rays and an oxide multilayer film provided on upper and lower portions of the resin substrate.

However, in case of using the resin substrate, cost is higher than that of the glass substrate, the substrate is easily bent due to external stress, and a coating yield of the oxide multilayer film is deteriorated.

In addition, in case of the conventional glass substrate (generally, using borosilicate glass) and resin substrate, stress occurs due to a difference in thermal expansion coefficient between a deposition material and a substrate during deposition of a near-infrared absorbing layer or a near-infrared reflective film, leading to warpage of the substrate. Thus, in case of the conventional substrate, it is difficult to ensure a deposition condition due to the warpage thereof.

Accordingly, there is a need for an advanced structure of an NIR cutoff filter.

Meanwhile, in the case of a smartphone used more widely than a video camera and a digital camera, there is a demand for a differentiated design with a high image quality and a high performance, and accordingly, a slimmer and lighter weight is required.

However, a high-resolution camera requires using a lens system in which the number of imaging lenses is minimally three or more. In addition, there is a limitation in reducing the thickness of the imaging device in accordance with the requirement for realizing the high resolution that a basic configuration of the NIR cutoff filter and the solid-state imaging device is required to be used, leading to a limitation in slimming of a smartphone.

Shapes of lenses constituting a lens system and a method of assembling the lens, and so on have been studied in order to reduce the thickness of the imaging device, and also a research has been conducted to minimize a thickness of a cover glass protecting the lens system.

In addition, a research has been conducted to reduce the thickness of the NIR cutoff filter of interest in the present invention. In particular, a research on the commercialization of 0.1 T glass substrate has been conducted instead of the resin substrate having the above-mentioned disadvantages.

However, there is a problem that the thinner the thickness of the glass substrate is, the weaker the strength thereof is and the machining and handling methods are difficult to implement.

In addition, the near-infrared reflective film formed on the glass substrate is generally configured as a multilayer film made of oxides. In this case, a difference in stress between the glass substrate and the oxide of the multilayer causes a deterioration in strength of the glass substrate, leading to critical problems in case of the thin plate glass having a thickness equal to or below 0.3 T.

SUMMARY OF THE INVENTION

Accordingly, the present invention has been made keeping in mind the above problems occurring in the related art, and an object of the present invention is to propose an optical filter which is provided by using a tempered glass substrate such that the strengthened optical filter is fabricated.

In addition, another object of the present invention is to propose a method of manufacturing an optical filter, the method including steps in which a base glass substrate is tempered and machined while kept in a sheet state and an optical filter layer is formed such that a strengthened optical filter is provided by implementing a simple manufacture method.

In order to achieve the above object, there is provided an optical filter including a tempered glass substrate and an optical filter formed on upper and lower surfaces of the tempered glass substrate.

In addition, in order to achieve the above object, there is provided a method of manufacturing an optical filter, the method including: forming a sheet-cutting portion on a base glass substrate on a per-cell basis; tempering the base glass substrate such that upper and lower surfaces thereof are tempered and a side portion thereof is tempered through the sheet-cutting portion as well; forming an optical filter on each of upper and lower surfaces of the base glass substrate; and dividing the base glass substrate into cells where each cell serves as a cell-based optical filter.

The tempered glass substrate may be made of aluminosilicate glass and chemically tempered. The chemical tempering may be implemented at a temperature ranging from 350° C. to 450° C. using potassium nitrate (KNO3).

The sheet-cutting portion may be formed by sheet-cutting the base glass substrate with a laser.

A strengthening resin layer is formed on either one or both of the upper and lower surfaces of the tempered glass substrate. The strengthening resin layer is preferably further provided below the optical filter layer.

The resin layer may be configured in a thickness of 0.1 μm to 20 μm. The resin layer may be selected from the group consisting of polycarbonate, epoxy resins, urethane resins, acrylic resins, acrylate, silane resins, and fluorine resins.

The resin layer may further include a near-infrared absorbing component.

The optical filter layer may be provided in which any one of a near-infrared reflective film and a visible light low reflection film is formed on each of the upper and lower surfaces of the tempered glass substrate, or a combination of the near-infrared reflective film and the visible light low reflection film is formed on each of the upper and lower surfaces of the tempered glass substrate to be served as the optical filter layer.

The base glass substrate may have a thickness of 0.05 mm to 0.3 mm.

The optical filter may be a near-infrared cutoff filter.

According to the present invention, an optical filter is manufactured by using a tempered glass substrate such that a strengthened optical filter is provided.

In addition, according to the present invention, a strengthening resin layer is formed on a tempered glass substrate for further strengthening, leading to significant strengthening of an optical filter.

In addition, according to the present invention, the entire process is performed in a sheet state such that the process is simple, and it is convenient to handle and machine a glass substrate, particularly a thin glass of 0.3 mm or less whereby the overall process yield is improved and the process cost is reduced.

Particularly, it is difficult to handle, machine, and strengthen a thin glass substrate conventionally, but the present invention has an effect of eliminating the difficulties by forming a sheet-cutting portion while keeping a base glass substrate in a sheet state.

In addition, a thin glass substrate of 0.05 T to 0.3 T, that is, 0.3 mm or less, is tempered and is further improved in strength by a strengthening resin layer such that an optical filter is provided by using the thin glass substrate, whereby the slimness of the optical filter is achieved, leading to slimming of an imaging device.

In addition, a strengthening resin layer is formed and then an optical filter layer is formed such that the coatability of the optical filter layer is improved and the difference in stress between the optical filter layer and the glass substrate is reduced, whereby the glass substrate is further strengthened and the warpage of the substrate is minimized. Accordingly, a high-quality optical filter can be provided and commercialization thereof can be expected.

Furthermore, a near-infrared reflective film or a visible light low reflection film according to an optical design is formed as an optical filter layer to block light in a near-infrared wavelength band and to minimize visible light reflectance such that a near-infrared cutoff filter having excellent performance is provided.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Hereinbelow, exemplary embodiments of the present invention will be described in detail with reference to the accompanying drawings. However, in the following description, it is to be noted that, when the functions of conventional elements and the detailed description of elements related with the present invention may make the gist of the present invention unclear, a detailed description of those elements will be omitted.

The present invention relates to an optical filter and a method of manufacturing the same, in which an optical filter is provided by using a tempered glass substrate such that the optical filter is strengthened and a base glass substrate is tempered and machined while kept in a sheet state and an optical filter layer is formed on upper and lower surfaces of the glass substrate such that a strengthened optical filter is provided by implementing the simple manufacture method.

In addition, according to the present invention, a strengthening resin layer is formed between the glass substrate and the optical filter layer to further strengthen the optical filter.

In addition, a thin glass substrate of 0.05 T to 0.3 T, that is, 0.3 mm or less, is tempered to provide the optic filter with the thin glass substrate, and the thin glass substrate is further improved in strength by forming a strengthening resin layer thereon, whereby the slimness of the optical filter is achieved, leading to slimming of an imaging device.

In addition, the strengthening resin layer is formed and then the optical filter layer is formed such that the coatability of the optical filter layer is improved and the difference in stress between the optical filter layer and the tempered glass substrate is reduced, whereby the glass substrate is further strengthened and the warpage of the substrate is minimized.

Accordingly, a high-quality optical filter can be provided and commercialization thereof can be expected.

Furthermore, a near-infrared reflective film or a visible light low reflection film according to an optical design is formed as the optical filter layer to block light in a near-infrared wavelength band and to minimize visible light reflectance such that a near-infrared cutoff filter having excellent performance is provided.

Figure 1:
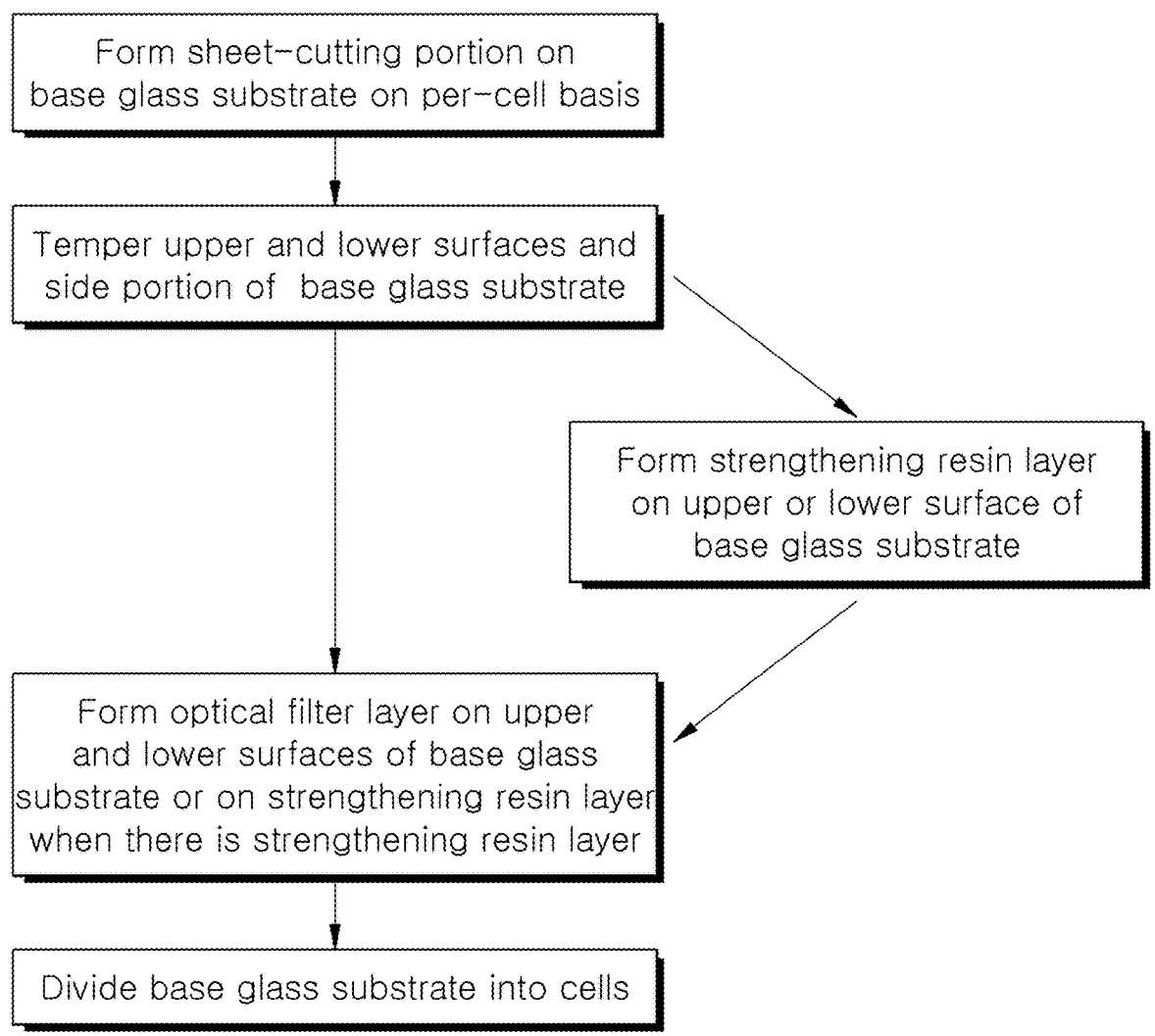
FIG. 1 is a block diagram illustrating a method of manufacturing an optical filter according to an embodiment of the present invention.
Figure 2:
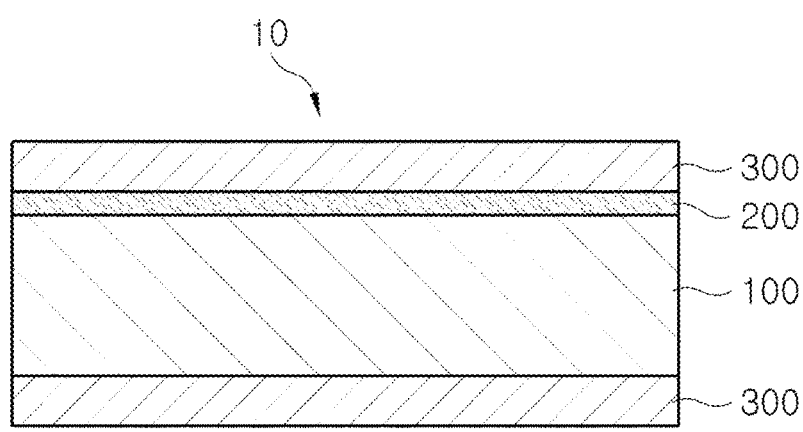
FIG. 2 is a cross-sectional view schematically illustrating an optical filter according to an embodiment of the present invention.
Figure 3:
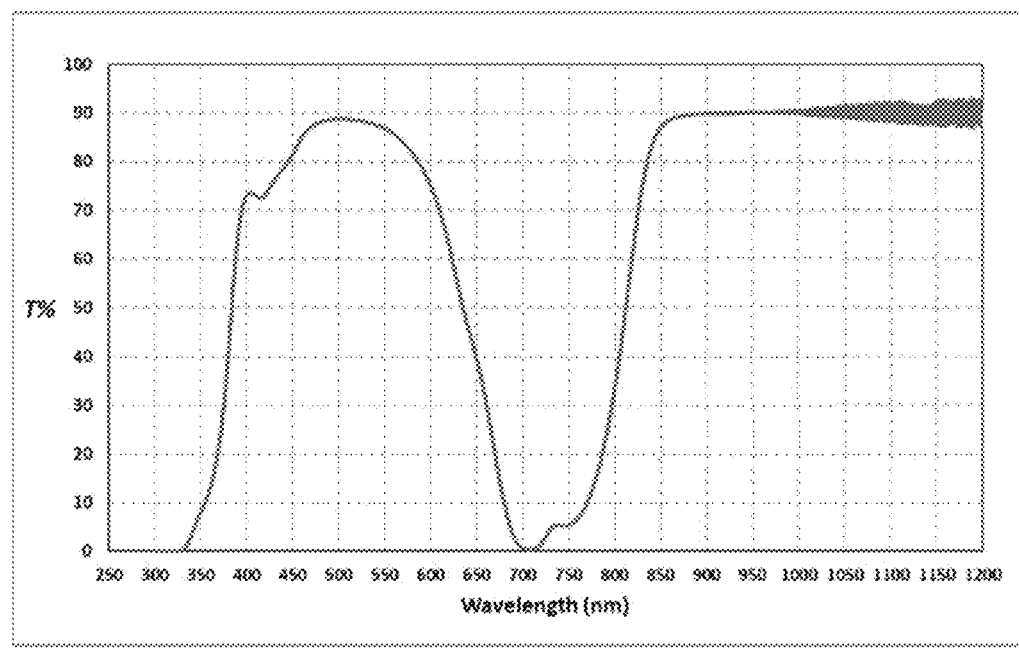
FIG. 3 is a graph illustrating a characteristic curve after a strengthening resin layer is formed according to the embodiment of the present invention.
Figure 4:
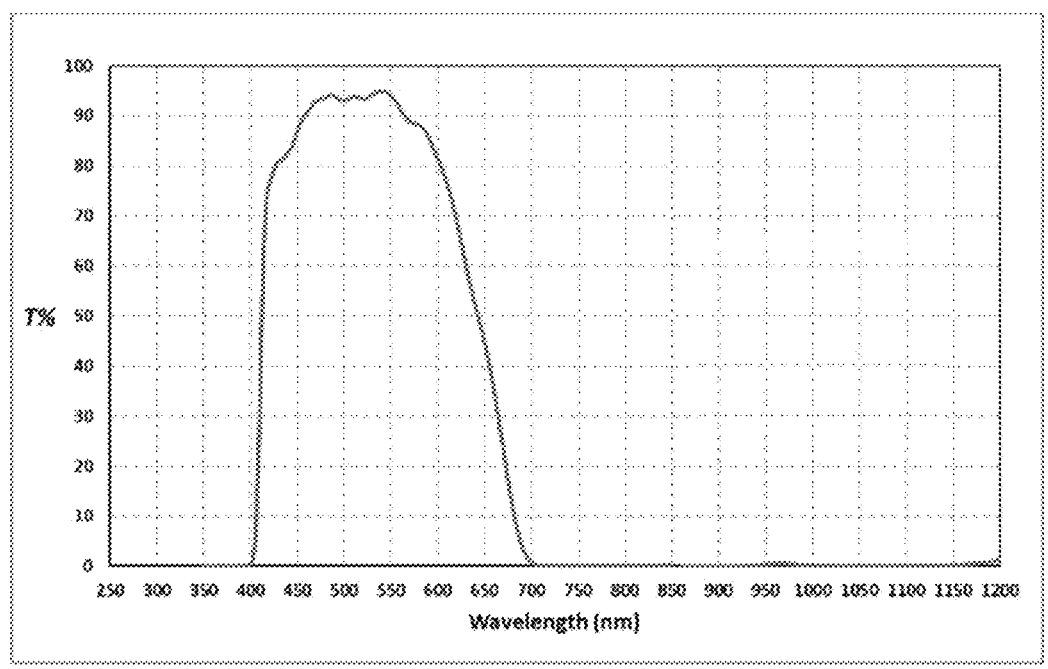
FIG. 4 is a graph illustrating a characteristic curve of a near-infrared cutoff filter after a near-infrared reflective film is formed according to the embodiment of the present invention.

Hereinbelow, an embodiment of the present invention will be described in detail with reference to accompanying drawings. FIG. 1 is a block diagram illustrating a method of manufacturing an optical filter according to an embodiment of the present invention; FIG. 2 is a cross-sectional view schematically illustrating an optical filter according to an embodiment of the present invention; FIG. 3 is a graph illustrating a characteristic curve after a strengthening resin layer is formed according to the embodiment of the present invention; and FIG. 4 is a graph illustrating a characteristic curve of a near-infrared cutoff filter after a near-infrared cutoff filter is formed according to the embodiment of the present invention.

As shown, the method of manufacturing the optical filter according to the present invention includes: forming a sheet-cutting portion on a base glass substrate on a per-cell basis; tempering the base glass substrate 100 such that upper and lower surfaces of the base glass substrate 100 are tempered and a side portion thereof is tempered through the sheet-cutting portion as well; forming an optical filter layer 300 on each of upper and lower surfaces of the base glass substrate 100; and dividing the base glass substrate 100 into cells where each cell serves as a cell-based optical filter 10.

Using a thin glass substrate as the base glass substrate or the cell-based glass substrate may be more effective in the present invention. Particularly, when using a thin glass substrate 100 having a thickness of 0.05 T to 0.3 T, that is, a thickness of 0.3 mm or less, the thin glass substrate 100 is strengthened such that the strength of the optical filter 10 is enhanced and the optical filter 10 becomes slim.

The reference numeral 100 shown in FIG. 2 may be used for both the base glass substrate and the cell-based glass substrate.

In the method of manufacturing the optical filter according to the embodiment of the present invention, the sheet-cutting portion is formed on the base glass substrate 100 on a per-cell basis.

The base glass substrate 100 is made of aluminosilicate glass and chemically tempered.

The sheet-cutting portion is formed by sheet-cutting the base glass substrate 100 with a laser, and a crack is formed through upper and lower portions of the base glass substrate 100 by the laser, without forming a breaking line.

Portions of the base glass substrate 100 on both sides of the sheet-cutting portion divided by the crack are engaged with each other in a form of a zigzag or a screw mating such that the portions of the base glass substrate 100 on both sides of the sheet-cutting portion are held in mutual engagement, whereby the base glass substrate is kept in a sheet state.

That is, although the base glass substrate 100 is configured with the sheet-cutting portion formed by the crack formed through the upper and lower portions of the substrate, the base glass substrate 100 is kept in the sheet state without being divided into cells. This is referred to as sheet-cutting in the present invention.

Then, when tempering the base glass substrate 100, a side portion of the base glass substrate 100 is tempered through the sheet-cutting portion.

That is, when cutting the base glass substrate 100 on a per-cell basis, the sheet-cutting portion becomes the side portion of the base glass substrate 100. Thus, tempered layers of about 20 μm to 90 μm are formed on the upper and lower surfaces of the base glass substrate 100, and on the side portion through the sheet-cutting portion as well.

The base glass substrate 100 is made of aluminosilicate glass.

A tempering process of the base glass substrate 100 is implemented according to chemical tempering at a temperature ranging from 350° C. to 450° C. using potassium nitrate (KNO3). After tempering, the substrate is gradually cooled to prevent cracks, and the base glass substrate 100 is cleaned after the tempering is completed.

That is, the base glass substrate 100 kept in the sheet state is tempered by the process. In this case, not only the upper and lower surfaces of the base glass substrate 100, but also the side portion, that is, a cut surface of the cell-based glass substrate, is tempered accordingly.

A sheet process is possible in which the tempering process is performed in a state in which the base glass substrate 100 is kept in the sheet state, thereby improving mass productivity and durability as compared to the conventional cell type process.

Particularly, when performing the conventional cell type process, it is difficult to temper the thin glass substrate whereby it is difficult to put the thin glass substrate to practical use due to the limit of the strength thereof.

However, according to the present invention, the thin glass is tempered in the sheet state due to formation of the sheet-cutting portion whereby it is possible to handle and machine the thin glass substrate 100 easily, temper the side portion of the glass substrate as well, and provide the tempered thin glass substrate 100.

That is, in the conventional sheet process, the side portion, which is the cut surface of the base glass substrate 100, is not tempered such that the strength of the side portion is weak. However, according to the present invention, since it is possible to temper the side portion while keeping the substrate in the sheet state, it is possible to improve the yield and the strength thereof.

Then, a strengthening resin layer 200 is formed on the upper or lower surface of the base glass substrate 100. The strengthening resin layer 200 may be formed entirely on any one among the upper and lower surfaces of the base glass substrate 100 or may be formed entirely on the upper and lower surfaces of the base glass substrate 100 such that the process yield is improved.

According to the embodiment of the present invention, FIG. 2 shows that the strengthening resin layer 200 is formed on the base glass substrate 100, an optical filter layer 300 is formed on the strengthening resin layer 200, and the bottom is provided with an optical filter layer 300 only. In FIG. 2, the glass substrate 100 may be a tempered base glass substrate or a tempered cell-based glass substrate, neither of which is specifically shown.

The base glass substrate 100 is coated with the resin layer 200 to improve the strength of the base glass substrate 100 and to minimize the difference in stress between the optical filter layer 300 and the glass substrate 100 such that the strengthening resin layer 200 serves to minimize the strength reduction and warpage of the base glass substrate 100.

That is, a stress occurs due to differences in thermal expansion coefficient, etc. at coupling faces between the oxide multilayer film (e.g., $SiO_2$, $TiO_2$, $Ta_2O_5$, etc.) used as the optical filter layer 300 and the glass substrate 100. As a result, a balance of the compressive stress of the glass substrate 100 is broken from external impacts, causing the strength to be deteriorated or causing warpage of the glass substrate. Therefore, by forming the strengthening resin layer 200 between the glass substrate 100 and the optical filter layer 300, it is possible to prevent a direct coupling of the glass substrate 100 and the optical filter layer 300, which causes warpage and a deterioration of strength.

Here, it is preferable that the strengthening resin layer 200 is formed of a transparent material with a thickness of 0.1 µm to 20 µm so as not to affect the visible light transmittance. More preferably, the strengthening resin layer 200 is about 0.5 µm to 5 µm in thickness to ensure almost no decrease in transmittance, reinforcement of the strength, and slimness of the product.

Meanwhile, the strengthening resin layer 200 may further include a near-infrared absorbing component to block near infrared rays more effectively.

The near infrared absorbing component may be a dye that absorbs near infrared rays, such as squarylium dyes, phthalocyanine dyes, or cyanine dyes, such that absorption of visible light is minimized and absorption of near infrared rays is maximized whereby it is possible to provide a high performance NIR cutoff filter.

The strengthening resin layer 200 is made of a transparent material having excellent coatability, and the material may be selected from the group consisting of polycarbonate, epoxy resins, urethane resins, acrylic resins, acrylate, silane resins, and fluorine resins. If necessary, the material of the resin layer 200 is mixed with the near-infrared absorbing component. It is possible to adjust the amount of the near-infrared absorbing component according to the specification of the near-infrared ray filter in a manner that does not interfere in the transmission of visible light.

Coating of the material of the resin layer 200 may be implemented by various methods, such as dipping, spin coating, die coating, bar coating, spraying, screen printing, inkjet printing, dispensing, imprinting, etc., which are capable of coating the glass substrate 100 with the resin material.

Meanwhile, the formation of the strengthening resin layer 200 may be implemented selectively after tempering of the base glass substrate 100. Otherwise, after tempering the base glass substrate 100, a formation of the optical filter layer 300 may be implemented which will be described below.

The optical filter layer 300 is formed on the upper and lower surfaces of the base glass substrate 100. In case that the strengthening resin layer 200 is formed on the base glass substrate 100 prior, the optical filter layer 300 is formed on the strengthening resin layer 200.

That is, in case that the strength-enhancing resin layer 200 is formed, the optical filter layer 300 is formed on the strengthening resin layer 200 so that the glass substrate 100 and the optical filter layer 300 are not directly coupled. When the strengthening resin layer 200 is formed on only one of the upper and lower surfaces of the base glass substrate 100, the optical filter layer 300 is directly formed on one surface of the base glass substrate 100 and formed on the strengthening resin layer 200.

The optical filter layer 300 is for selectively reflecting or transmitting a specific wavelength band. In an embodiment of the present invention, the optical filter layer 300 may be implemented as a near-infrared reflection film or a visible light low reflection film.

The optical filter layer 300 is mainly formed by depositing an oxide multilayer film (e.g., $SiO_2$, $TiO_2$, $Ta_2O_5$, etc.). Specifically, the optical filter layer 300 is formed by selectively depositing an oxide multilayer film having a high refractive index and a low refractive index of a predetermined thickness in order to minimize the incident angle dependence according to an optical design depending on purposes or uses and to transmit or reflect a specific wavelength band.

That is, according to an optical design depending on the purpose or use, any one of the visible light low reflection film and the visible light low reflection film may be formed on each of the upper and lower surfaces of the tempered glass substrate, or a combination thereof may be formed on the upper and lower surfaces of the tempered glass substrate.

For example, any one of the multilayer near-infrared reflective film and visible light low reflection film may be formed on each of the upper and lower surfaces of the tempered glass substrate. Alternatively, the multilayer near-infrared reflective film is formed on the upper surface of the tempered glass substrate and the multilayer visible light low reflection film is formed on the lower surface of the tempered glass substrate (or vice versa), or a combination of the multilayer near-infrared reflective film and visible light low reflection film is formed on each of the upper and lower surfaces of the tempered glass substrate.

The formation of the optical filter layer 300 is implemented by known physical and chemical deposition methods, such as E-beam, sputtering, CVD.

After the formation of the optical filter layer 300 is completed, the base glass substrate 100 is divided into cells where each cell serves as the optical filter 10.

That is, after the entire process is completed while the base glass substrate 100 is kept in the sheet state, the base glass substrate 100 is divided into the cells where each cell serves as the cell-based optical filter 10.

Specifically, a breaking line is formed on the cell-based glass substrate 100 by using a laser to cut into the cells or a predetermined pressure is applied to the cell-based glass substrate 100 to cut into cells such that the cell-based optical filter 10 is provided.

Applying of a constant pressure required for the cell division may be implemented by any method capable of directly applying a predetermined pressure or impact to each of the cells formed on the base glass substrate 100. For example, the base glass substrate 100 configured into the cells is jig-transferred and the cell-based glass substrate 100 is pressed by an automated punching machine to divide into the cells, or the base glass substrate 100 configured into the cells is supplied to the outside to apply a predetermined pressure manually such that the substrate is divided into the cells.

FIG. 3 shows a graph illustrating a characteristic curve of a substrate after forming a resin layer (addition of squarylium dyes to urethane and acrylic synthetic resin) on a surface (upper surface in the drawing) of the tempered glass substrate (0.1 mm of thickness). It is confirmed that the substrate exhibits excellent absorption performance in the near-infrared region.

FIG. 4 is a graph illustrating a characteristic curve of an NIR cutoff filter (incident angle of 0 DEG) in which a resin layer is formed on an upper surface (front face) of a glass substrate and an optical filter layer is formed on each of an upper surface (front face) of the resin layer and a lower surface (rear face) of the substrate (twenty-four near-infrared reflective films (front face)/glass substrate/eighteen visible light low reflection films (rear face) with $SiO_2$ or $TiO_2$) according to the embodiment of the present invention. It was confirmed that the NIR cutoff filter exhibits excellent near-infrared reflection and absorption performances of 90% or more (wherein the front surface refers to a surface of the glass substrate on which the light is incident, and the rear surface refers to the opposite).

Table 1 below shows the strength of the tempered glass substrate configured with the strengthening resin layer according to the present invention. The measurement method was as follows: a specimen was placed on a bottom jig (6.42 mm×6.42 mm); and the specimen was pressurized with a pressing part (2 mm in diameter, 1R) of a top jig to measure the breaking strength (speed of the pressing part, 50 mm/min).

For comparison, strength of an 0.1 T (0.1 mm) thick tempered glass substrate (aluminosilicate glass) specimen (B/G, bare glass) prepared according to the embodiment of the present invention was also measured.

Here, in the case of a specimen having a resin layer formed thereon, the strength was measured for a case where the resin layer was formed on the bottom surface of the tempered glass substrate and a case where the resin layer was formed on the top surface of the tempered glass substrate.

TABLE 1

| Specimen | B/G (tempered glass substrate) | Tempered glass substrate with resin layer | |
|---|---|---|---|
| | | Bottom | Top |
| 1 | 8.87 | 9.22 | 7.83 |
| 2 | 9.30 | 9.54 | 8.99 |
| 3 | 9.35 | 8.97 | 8.80 |
| 4 | 7.71 | 8.79 | 8.53 |
| 5 | 7.73 | 8.04 | 8.86 |
| 6 | 6.95 | 8.90 | |
| 7 | 9.49 | 9.01 | |
| 8 | 8.92 | 8.92 | |
| 9 | 9.01 | 8.45 | |
| 10 | 7.88 | 9.09 | |
| Max | 9.49 | 9.54 | 8.99 |
| Min | 6.95 | 8.04 | 7.83 |
| AVG | 8.52 | 8.89 | 8.60 |
| STDEV (standard deviation) | 0.88 | 0.41 | 0.46 |
| B10 | 7.50 | 8.35 | 8.17 |

(Unit: kgf)

As shown in Table 1, it was found that the strength of the tempered glass substrate with the resin layer was higher than that of the tempered glass substrate without the resin layer. In addition, according to the measurement result, both of the tempered glass substrate without the resin layer and the tempered glass substrate with the resin layer have high strengths compared to B10, which is expected strength when a defective ratio was 10%.

It is generally known that a 0.1 T glass substrate that is not tempered has strength of 1 kgf to 2 kgf and a resin substrate has strength of about 1 kgf. Thus, it was found that the tempered glass substrate according to the present invention is remarkably improved in strength and the reinforced glass substrate with the resin layer was further improved in strength.

The present invention provides an optical filter, in which an optical filter is provided by using a tempered glass substrate such that the optical filter is strengthened and a base glass substrate is tempered and machined while kept in a sheet state, and if necessary, an optical filter layer is formed on upper and lower sides of the glass substrate such that a strengthened optical filter is provided by implementing the simple manufacture method.

In addition, according to the present invention, the entire process is performed in the sheet state such that the process is significantly simple, and it is convenient to handle and machine the glass substrate whereby the overall process yield is improved and the process cost is reduced. Particularly, it is difficult to handle, machine, and strengthen a thin glass substrate conventionally, but the present invention has an effect of eliminating the difficulties by forming the sheet-cutting portion while keeping the base glass substrate in the sheet state.

In addition, the thin glass substrate of 0.05 T to 0.3 T, that is, 0.3 mm or less is, tempered and is further improved in strength by the strengthening resin layer such that an optical filter is provided by using the strengthened thin glass substrate, whereby the slimness of the optical filter is achieved, leading to slimming of an imaging device.

In addition, a strengthening resin layer is formed and then an optical filter layer is formed such that the coatability of the optical filter layer is improved and the difference in stress between the optical filter layer and the glass substrate is reduced, whereby the glass substrate is further strengthened and the warpage of the substrate is minimized. Accordingly, a high-quality optical filter can be provided, contributing to the commercialization of an optical filter using the thin glass substrate.

Furthermore, the near-infrared reflective film or the visible light low reflection film according to the optical design is formed as the optical filter layer to block light in a near-infrared wavelength band and to minimize visible light reflectance such that a near-infrared cutoff filter having excellent performance is provided.

What is claimed is:

1. An optical filter comprising:
   a tempered glass substrate having a thickness of 0.05 mm to 0.3 mm; and
   an optical filter formed on upper and lower surfaces of the tempered glass substrate,
   wherein a strengthening resin layer is formed on either one or both of the upper and lower surfaces of the tempered glass substrate in a manner being interposed between the tempered glass substrate and the optical filter layer, and
   the resin layer is configured in a thickness of 0.1 μm to less than 5 μm.

2. The optical filter of claim 1, wherein the tempered glass substrate is made of aluminosilicate glass and chemically tempered.

3. The optical filter of claim 2, wherein the chemical tempering is implemented at a temperature ranging from 350° C. to 450° C. using potassium nitrate (KNO3).

4. The optical filter of claim 3, wherein the optical filter is a near-infrared cutoff filter.

5. The optical filter of claim 1, the resin layer is selected from the group consisting of polycarbonate, epoxy resins, urethane resins, acrylic resins, acrylate, silane resins, and fluorine resins.

6. The optical filter of claim 1, the resin layer further includes a near-infrared absorbing component.

7. The optical filter of claim 1, wherein the optical filter layer is provided in which any one of a near-infrared reflective film and a visible light low reflection film is formed on each of the upper and lower surfaces of the tempered glass substrate, or a combination of the near-infrared reflective film and the visible light low reflection film is formed on each of the upper and lower surfaces of the tempered glass substrate to be served as the optical filter layer.

8. The optical filter of claim 7, wherein the optical filter is a near-infrared cutoff filter.

9. The optical filter of claim 1, wherein the optical filter is a near-infrared cutoff filter.

10. A method of manufacturing an optical filter, the method comprising:
    forming a sheet-cutting portion on a base glass substrate having a thickness of 0.05 mm to 0.3 mm on a per-cell basis;
    tempering the base glass substrate such that upper and lower surfaces thereof are tempered and a side portion thereof is tempered through the sheet-cutting portion as well;
    forming an optical filter on each of upper and lower surfaces of the base glass substrate; and
    dividing the base glass substrate into cells where each cell serves as a cell-based optical filter,
    wherein, after tempering of the base glass substrate, a strengthening resin layer is formed on either one or both of the upper and lower surfaces of the base glass substrate in a manner being interposed between the base glass substrate and the optical filter layer, and
    the resin layer is configured in a thickness of 0.1 μm to less than 5 μm.

11. The method of claim 10, wherein the base glass substrate is made of aluminosilicate glass.

12. The method of claim 11, wherein tempering of the base glass substrate is implemented by chemical tempering.

13. The method of claim 12, wherein the chemical tempering is implemented at a temperature ranging from 350° C. to 450° C. using potassium nitrate (KNO3).

14. The method of claim 13, wherein the optical filter is a near-infrared cutoff filter.

15. The method of claim 10, wherein the sheet-cutting portion is formed by sheet-cutting the base glass substrate with a laser.

16. The method of claim 10, the resin layer is selected from the group consisting of polycarbonate, epoxy resins, urethane resins, acrylic resins, acrylate, silane resins, and fluorine resins.

17. The method of claim 10, the resin layer further includes a near-infrared absorbing component.

18. The method of claim 10, wherein the optical filter layer is provided as any one of a near-infrared reflective film or a visible light low reflection film, or a combination of the near-infrared reflective film and the visible light low reflection film.

19. The method of claim 18, wherein the optical filter is a near-infrared cutoff filter.

20. The method of claim 10, wherein the optical filter is a near-infrared cutoff filter.

* * * * *